United States Patent Office  3,057,575
Patented Oct. 9, 1962

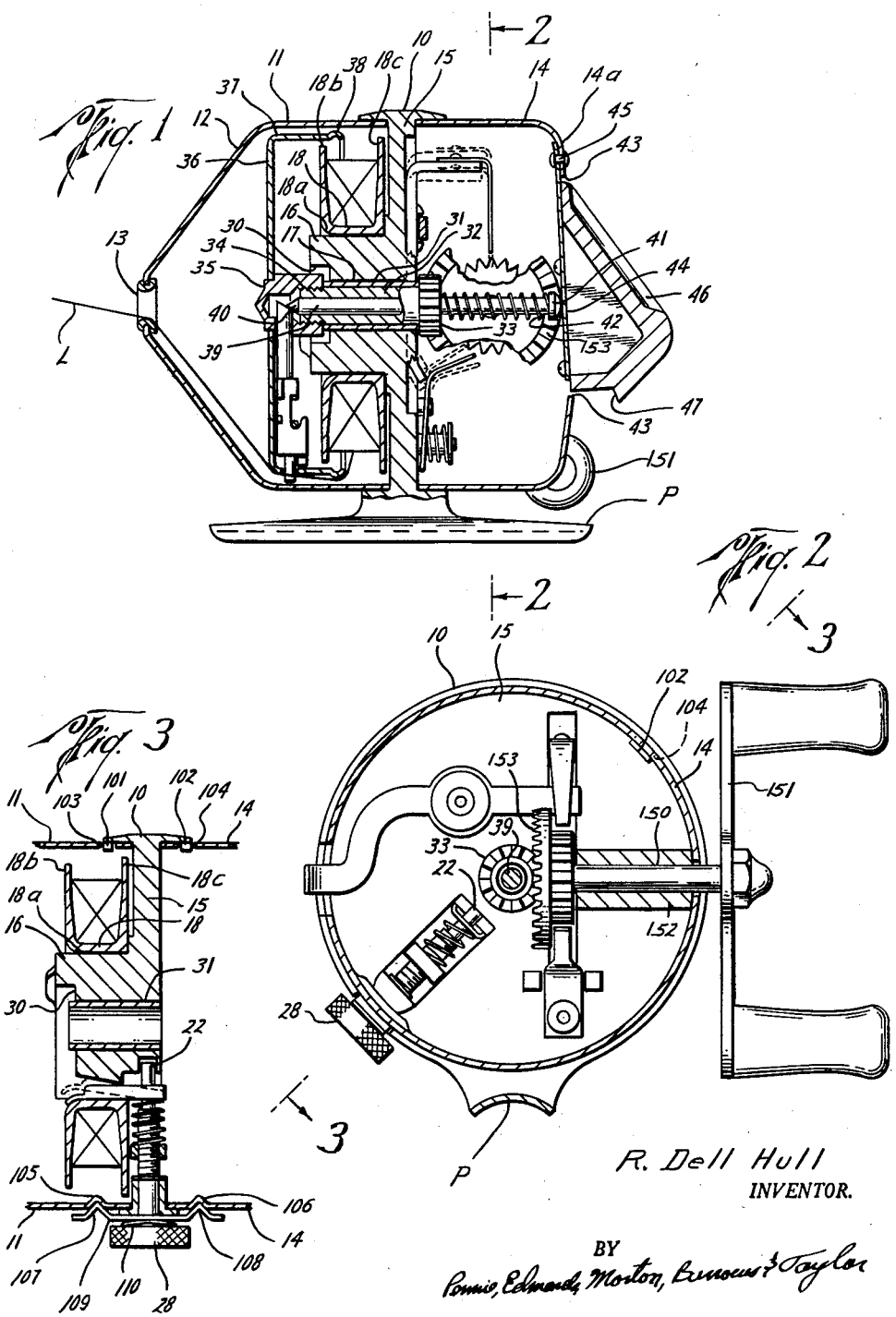

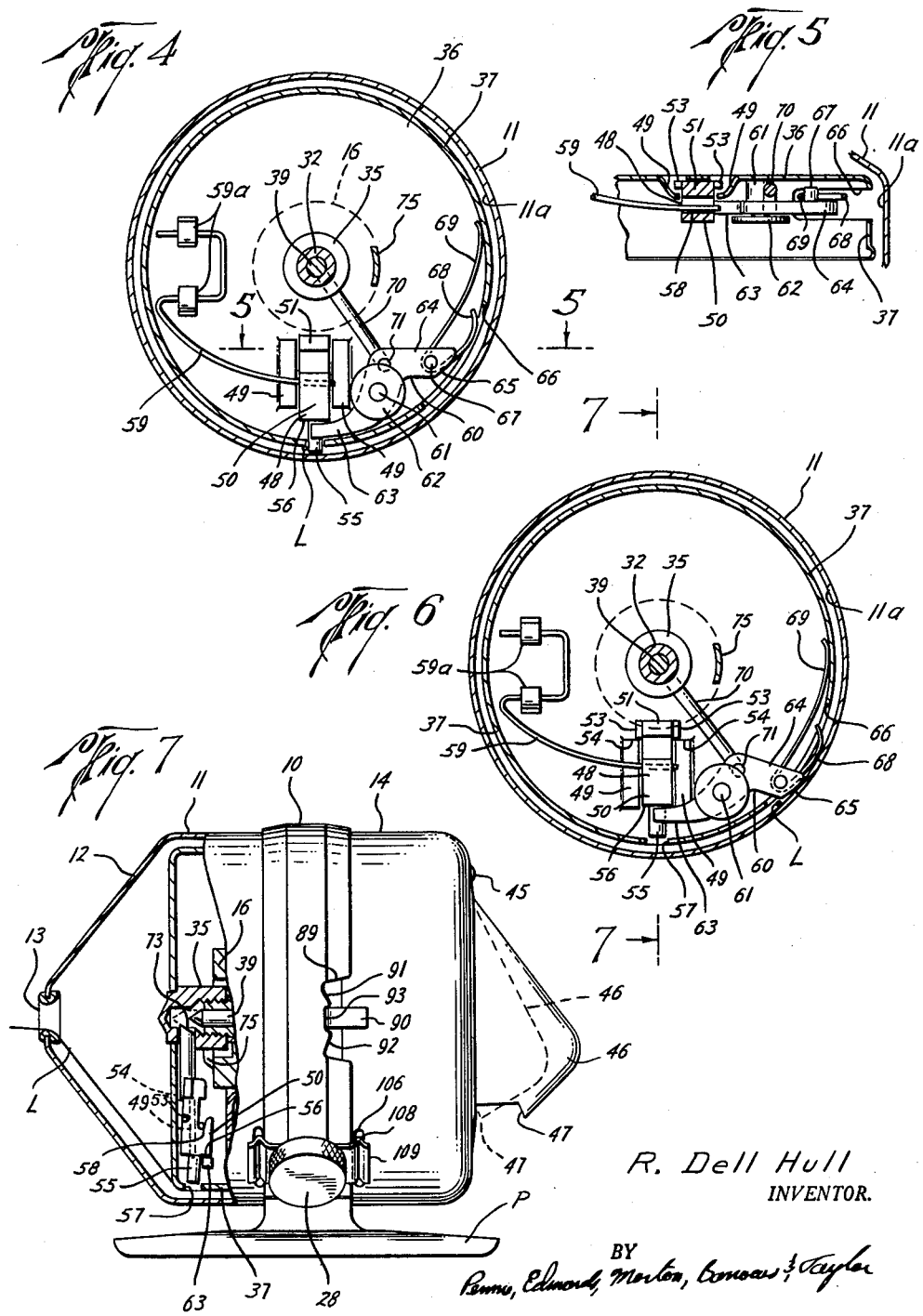

3,057,575
CASING FOR CLOSED-FACE SPINNING REEL
R. Dell Hull, 1131 E. Easton St., Tulsa 11, Okla.
Original application Aug. 27, 1957, Ser. No. 680,501.
Divided and this application Jan. 26, 1959, Ser. No. 789,039
1 Claim. (Cl. 242—84.2)

This application is a divisional of my co-pending application Serial No. 680,501, filed August 27, 1957, for "Closed-Face Spinning Reel."

This invention relates to fishing reels and more particularly to improvements in spinning reels.

The present invention is directed to improvements in spinning reels of the so-called "closed-face" type. In this type of spinning reel, the line spool is enclosed within a casing normally provided with a front portion or cover, which may be of conical or concavo-convex form, having a central opening or eye through which the line travels as it moves over the front face or flange of the line spool in passage to and from the spool, the line opening being ordinarily co-axial with the axis of the spool. Reels of this general type are illustrated in my U.S. Patents Nos. 2,668,025 and 2,675,192.

A primary object of the present invention is to provide a spinning reel of the general type described in which the various operating and line control elements are of improved and generally simplified design, whereby to improve the efficiency and ease of operation, and to reduce cost of construction of the reel. Specifically this invention relates to a simply constructed and improved form of cover and reel assembly for a spinning reel, providing a reel structure which is durable in use, economically manufactured and which facilitates removal and replacement of the covers from time to time as may be required.

Other and more specific objects and advantages of this invention will become more readily apparent from the following detailed description when read in conjunction with the accompanying drawings which illustrate a useful embodiment of the improved reel structure in accordance with the present invention.

In the drawing:

FIG. 1 is a longitudinal sectional view of the reel showing the parts in the positions occupied during rewinding;

FIG. 2 is a transverse cross-sectional view taken generally along line 2—2 of FIG. 1; and FIG. 3 is a cross-sectional view taken generally along the line 3—3 of FIG. 2 showing details of cover and reel assembly, some of the other parts of the reel being removed for purposes of clarity.

Referring to the drawings:

The reel comprises a generally tubular casing or frame 10 constructed of any suitable material, such as metal, plastic, or the like, and is provided with a front cover 11 insertible in the forward end portion of casing 10 and removably secured thereto in a manner to be hereinafter described. Casing 10 is provided with the usual mounting means, in the form of a support plate P for attaching the reel to the reel seat of a fishing rod in the usual manner. The forward portion of cover 11 is formed with a forwardly tapered conical portion 12 provided at its apex with a line guide opening 13 through which the line L may pass to and from the interior of the cover. A rear cover 14 fits into the rear end portion of casing 10 and is removably secured thereto in a manner to be described subsequently. A wall 15 extends across casing 10 and has formed in the center thereof a forwardly projecting cylindrical boss 16 having an axial bore 17. A line spool 18 having an axial bore 18a and forward and rear flanges 18b and 18c, respectively, is mounted on boss 16 in front of wall 15 and is arranged for controlled rotation about boss 16, as will be more fully described hereinafter.

Rotation of spool 18 about boss 16 is controlled by a slipping clutch or drag mechanism, adjustable by brake rod 22, which forms the subject matter of my U.S. Patent No. 2,991,957.

The forward end of bore 17 is counterbored for a short distance to provide the annular recess 30, and an antifriction bearing 31 is disposed in bore 17 and projects slightly forwardly into recess 30, as best seen particularly in FIG. 1. A tubular shaft 32 is slidably inserted in the bore of bearing 31 and is rotatable therein and carries on its rearward end a pinion 33 which is fixedly secured on the shaft and bears against the rearward end of bearing 31, which forms a stop therefor. The forward end of shaft 32 extends in front of the end of boss 16 and is reduced in diameter and is externally threaded at 34 to threadedly receive the hollow hub 35 of a circular pick-up head 36 which is secured to hub 35 and has about its outer periphery an annular flange 37 which projects rearwardly over the outer periphery of spool flange 18b to a point intermediate the spool flanges. The inner end of hub 35 when screwed on threads 34 of the shaft will extend into recess 30 and abut the forward end of bearing 31 and thereby draw pinion 33 against the rearward end of bearing 32 and hold these parts together. The rearward end of flange 37 is rounded at 38 to permit smooth passage of the line L thereover in its movement to and from spool 18.

A crank shaft 150 (FIG. 2) is mounted in casing 10 at right angles to its longitudinal axis and projects radially through the wall of the casing and has mounted on its outer end a winding handle 151. The inner end of crank shaft 150 is journaled in a support bearing 152 which is supported on the rear face of wall 15. Crank shaft 150 carries on its inner end a gear 153 which is in mesh with pinion 33, whereby rotation of crank shaft 150 will rotate shaft 32 and pick-up head 36.

A cylindrical control rod 39 extends slidably through the bore of shaft 32 and through pinion 33 and projects rearwardly from the latter. The forward end of rod 39 extends into the bore of hub 35, as best seen in FIG. 1 and has its forward end shaped to provide the forwardly tapering conical tip 40. The rearwardly projection portion of control rod 39 extends to a point adjacent the rear wall 14a of rear cover 14 and has mounted on its rearward end a rounded head 41. A coil spring 42 is mounted about the rear portion of rod 39 and is disposed in compression between head 41 and pinion 33, thereby normally urging the control rod rearwardly in shaft 32. The rear wall 14a of cover 14 is provided with an opening 43 and a leaf spring 44 having its upper end secured to the upper edge of opening 43 at 45 depends into opening 43. The free portion of the leaf spring is adapted to be resiliently pressed against head 41 on the control rod by pressure applied through a thumb pressure plate 46 which is secured to the rear face of leaf spring 44 and is projectable therewith through opening 43. Thumb pressure plate 46 is provided with a shoulder 47 which is adapted to engage the lower edge of opening 43 to limit the inward movement of leaf spring 44. It will be understood that when pressure is applied to thumb plate 46 leaf spring 44 will push against head 41 to overcome the resistance of coil spring 42 and thus urge control rod 39 forwardly against the resistance of coil spring 42. When pressure is relieved from thumb pressure plate 46, the normal resilience of leaf spring 44 will cause the leaf spring to retract and permit coil spring 42 to urge control rod 39 to its rearward position, as best seen in FIG. 1.

The axial movements of control rod 39 are employed to actuate the line pick-up and line-feathering elements of the reel, which forms the subject matter of my copending applications Serial No. 788,889, filed January 26, 1959, and Serial No. 680,501, filed August 27, 1957, now abandoned in favor of Serial No. 74,924 filed December 9, 1960. The reel herein described also includes improved anti-reverse and click mechanisms which form the subject matter of my copending application Serial No. 788,814, filed January 26, 1959.

In accordance with the present invention the reel also includes novel and improved means providing easily securable and releasable connections for the front and rear covers to casing 10, as best seen in FIGS. 2 and 3. These means comprise inwardly extending lugs 101 and 102 at oppositely disposed points on the forward and rearward edges, respectively, of casing 10, these lugs being receivable in correspondingly shaped notches or openings 103 and 104, respectively, adjacent the inner margins of the front and rear covers. The engagement of the lugs in the notches is such as to form simple hinge connections about which the covers may be swung into and out of inserted positions inside the forward and rear ends of casing 10. Diametrically opposite openings 103 and 104, the covers are provided with depressions or recesses 105 and 106, respectively, which are adapted to receive frictionally engaging lugs 107 and 108, respectively, carried at the opposite ends of a spring clip 109 which is secured exteriorly of the casing about the outer end of brake rod 22 and extends longitudinally of the casing beyond the forward and rear edges thereof, so that the lugs 107 and 108 may drop into notches 105 and 106 as the inner edges of the covers are pushed past the lugs in movement to seating positions inside the ends of the casing. A spring 110 is disposed between head 28 of the brake rod 22 and the outer face of clip 109 to apply spring pressure to the clip to thereby press the lugs into the notches and resiliently but firmly hold the covers in place. When it is desired to remove the covers the portions underlying lugs 107 and 108 are simply pulled outwardly with sufficient force to overcome the grip of the lugs and thereby draw them out from under the lugs. The covers may then be swung about the hinges formed by lugs 101 and 102 and notches 103 and 104, and after clearing the clips the covers may be pulled off of the hinge lugs and removed from the casing. The foregoing thus provides means whereby the covers may be easily attached and snapped into place in the ends of the casing and will be held firmly in place until necessary to remove them, as described.

The reel constructed as heretofore described is relatively light in weight, comprises parts which may be easily and quickly assembled and is, therefore, quite low in cost of manufacture, and which, by reason of its novel features of construction and combination thereof as described, is exceptionally easy to use and very efficient and substantially fool-proof in operation.

It will be understood that various changes and modifications may be made in the details of the illustrative embodiment within the scope of the appended claim but without departing from the spirit of this invention.

I claim:

A spinning reel of the type comprising a frame including an axially extending annular flange, an annular cover received concentrically within the flange and removably mounted on the frame, mutually interengaging means on the flange and cover for securing said cover to said flange, said mutually interengaging means pivotally connecting the cover to the frame for accommodation of attaching and removing movements of the cover, said cover having an indentation therein at a point substantially diametrically opposite said mutually interengaging means, a spring clip portion secured to said frame and having a radially projecting portion received in said indentation upon assembly of said cover to said frame, said mutually interengaging means comprising means in one of said cover and flange forming a recess and means on the other forming a projection received in said recess, said projection being removable from said recess to accommodate separation of said cover and frame, the frame further having a second annular flange extending in a direction opposite to the first-mentioned flange, a second annular cover received concentrically within said second flange, said second cover and second flange have second mutually interengaging means corresponding to the first mentioned interengaging means for pivotally securing said second cover to said second flange for accommodation of attaching and removing movements of said second cover, said second cover having an indentation therein substantially diametrically opposite said second mutually interengaging means, and a second spring clip portion secured to said frame and extending beyond said second flange, said second spring clip portion having a radially projecting portion received in the indentation in said second cover upon assembly thereof to said frame, said second mutually interengaging means comprising means in one of said second cover and second flange forming a second recess and means on the other forming a second projection received in said second recess, said second projection being removable from said second recess to accommodate separation of said second cover and frame, said first and second spring clip portions being integrally related in a single spring clip, and said spring clip being secured to said frame between said flanges.

References Cited in the file of this patent

UNITED STATES PATENTS

| | | |
|---|---|---|
| 2,125,749 | Rahr | Aug. 2, 1938 |
| 2,507,457 | Rix | May 9, 1950 |
| 2,551,321 | Ferguson | May 1, 1951 |
| 2,571,440 | Goldberg | Oct. 16, 1951 |
| 2,843,333 | Jones | July 15, 1958 |
| 2,903,201 | Sarah | Sept. 8, 1959 |